(12) United States Patent
Rehkugler

(10) Patent No.: US 6,797,397 B1
(45) Date of Patent: Sep. 28, 2004

(54) LAMINATION STRUCTURE WITH A STARCH TO PLASTIC BOND

(75) Inventor: Richard A. Rehkugler, Fairport, NY (US)

(73) Assignee: ExxonMobil Oil Corporation, Irving, TX (US)

(*) Notice: Subject to any disclaimer, the term of this patent is extended or adjusted under 35 U.S.C. 154(b) by 47 days.

(21) Appl. No.: 10/393,275

(22) Filed: Mar. 20, 2003

(51) Int. Cl.$^7$ .............................. B23B 3/28; B23B 27/08
(52) U.S. Cl. ...................... 428/501; 428/182; 428/507; 428/511; 428/530
(58) Field of Search ................................ 428/182, 501, 428/507, 508, 509, 511, 512, 527, 526, 530, 518, 537.5, 498

(56) References Cited

U.S. PATENT DOCUMENTS

| | | |
|---|---|---|
| 3,753,769 A | 8/1973 | Steiner |
| 3,849,224 A * | 11/1974 | Hintz et al. ................ 156/208 |
| 4,058,645 A | 11/1977 | Steiner |
| 4,214,039 A | 7/1980 | Steiner et al. |
| 4,409,274 A | 10/1983 | Chaplin et al. |
| 4,438,176 A | 3/1984 | Steiner et al. |
| 4,439,493 A | 3/1984 | Hein et al. |
| 4,695,503 A | 9/1987 | Liu et al. |
| 4,749,616 A | 6/1988 | Liu et al. |
| 4,842,893 A | 6/1989 | Yializis et al. |
| 4,853,602 A | 8/1989 | Hommes et al. |
| 4,855,187 A | 8/1989 | Osgood, Jr. et al. |
| 4,865,908 A | 9/1989 | Liu et al. |
| 4,944,990 A | 7/1990 | Liu et al. |
| 4,965,130 A | 10/1990 | Min et al. |
| 4,997,859 A | 3/1991 | Min et al. |
| 5,147,480 A | 9/1992 | Lang |
| 5,188,867 A | 2/1993 | Chu et al. |
| 5,419,960 A | 5/1995 | Touhsaent |
| 5,496,649 A | 3/1996 | Mallory et al. |
| 5,508,113 A | 4/1996 | Knoerzer |
| 5,547,764 A | 8/1996 | Blais et al. |
| 5,609,293 A | 3/1997 | Wu et al. |
| 5,772,819 A | 6/1998 | Olvey |
| 5,840,419 A | 11/1998 | Alder |
| 6,074,762 A | 6/2000 | Cretekos et al. |
| 6,080,495 A * | 6/2000 | Wright ...................... 428/623 |
| 6,083,580 A | 7/2000 | Finestone et al. |
| 6,280,825 B1 * | 8/2001 | Olvey ........................ 428/182 |
| 6,444,750 B1 | 9/2002 | Touhsaent |
| 2002/0122952 A1 | 9/2002 | Delisio et al. |

* cited by examiner

Primary Examiner—Donald J. Loney
(74) Attorney, Agent, or Firm—Rick F. James

(57) ABSTRACT

A lamination structure comprises a first layer bonded to a second layer. The first layer is bonded to the second layer by a destruct bond with a starch adhesive. The first layer may be a flat layer or a fluted layer and the second layer may be a flat or fluted layer. At least one surface of the first layer and/or the second layer, which is bonded to the other layer, is the surface of a thermoplastic film. The thermoplastic film is treated or coated in a manner sufficient to permit the surface or surfaces to form the above-mentioned destruct bond, using a starch adhesive. An example of a surface treatment is flame treatment. An example of a coating is an acrylic coating.

25 Claims, 2 Drawing Sheets

LAMINATION STRUCTURE WITH A STARCH TO PLASTIC BOND

BACKGROUND

A lamination structure includes a flat or fluted layer bonded to a flat layer or a fluted layer with a starch adhesive. At least one of the bonded surfaces may be a plastic surface.

Corrugated structures, such as cardboard and corrugated board structures, are described in the Finestone, et al. U.S. Pat. No. 6,083,580 (Finestone '580 patent).

Corrugated board products are used extensively for a wide range of packaging applications. Thus, most shipping cartons are fabricated of corrugated paperboard. In its fundamental form, corrugated paperboard is composed of a fluted paper core sandwiched between and bonded to inner and outer paper face liners.

Corrugated paperboard is usually fabricated of natural brown-color kraft paper, although some boards include an outer liner of white or coated paper, or other suitable material, depending on the finish desired. The choice of a finish liner must take into account that it is often the practice to label the board with printed data, or to apply decorative graphics thereto; hence the outer face liner must be receptive to printing inks. It is also desirable that the outer face liner render the board water resistant. The manner in which corrugated paperboard is manufactured is described in U.S. Pat. No. 5,147,480 to Lang. In this patent the outer face liner of the board is identified as a "single liner," the inner face liner is referred to as the "double liner," while the fluted core is called the "corrugated medium."

As noted in the Lang patent, the conventional technique for manufacturing corrugated paperboard makes use of a single facer unit and a double backer glue machine. In the single facer unit, a single face liner from a take-off roll is fed into the unit. A web of the medium to be corrugated is drawn from another take-off roll and fed through cooperating corrugator rolls. The resultant fluted or corrugated medium has adhesive applied to hereto before it is combined with the single face liner.

Thus, coming out of the single facer unit is a laminate web formed by the single face liner combined with the fluted medium. This laminate web is fed into the double backer glue machine where it is glued to a web of double liner drawn from a take-off roll.

Hence, emerging from the double backer glue machine is a continuous web of corrugated paperboard in which the fluted medium or core is sandwiched between and bonded to inner and outer face liners. This web immediately goes through a curing step, which cures the adhesive bond between the outer face liner and the fluted medium. The corrugated paperboard web is then slit, scored, and cut to provide corrugated paperboard having the desired carton specifications.

The structural strength and wearing properties of corrugated paperboard is in part determined by the face liners. Thus, when a shipping carton is made of corrugated paperboard whose outer face liner is kraft paper, this carton will not be water resistant and exposure to rain and snow in the course of shipment may weaken the carton.

Corrugated paperboard is likewise used to form inexpensive furniture items, such as storage units, shelving, and tables. Although these items have the advantage of being light-weight and inexpensive, they are subject to damage such as bending, creasing, and tearing. When such products are used in or near an area where water is present, water damage tends to destroy the appearance and, eventually, the structural integrity of the furniture item. There is thus a need for a cardboard material that can be used to form strong structures and containers wherein the cardboard also has the ability to resist water and other fluid damage.

Plastic film may be laminated to the outside surface of the finished cardboard in order to make it water resistant and also to enhance the appearance of the cardboard, such as, for example, by the application of decorative plastic film. A protective coating of wax or polyethylene may also be applied to the outside surface of a finished cardboard product.

In the Finestone '580 patent, it is stated that a typical prior art method of laminating plastic film to corrugated paperboard is to attach the film to the outer face liner of the finished corrugated paperboard, during an off-line process on separate laminator equipment. That is, lamination does not take place at the "process end" of the production line where the inner and outer face liners are adhered to the fluted medium. Instead, prior art methods of applying a plastic film laminate layer wait until after the fluted core has been sandwiched between paper face liners and the adhesive holding this "sandwich" has cured. The separate steps involved in such lamination processes add greatly to the cost of the laminated product, by increasing scheduling difficulties in the manufacture of different production runs, and by producing a higher percentage of waste material. Additionally, the Finestone '580 patent states that flexible plastic film material is slippery and tends to shrink when heated, making it more difficult—and therefore more costly—to work with. Furthermore, the nature of the film may be such as to preclude printing of the outer liner with standard printing inks.

In the Finestone '580 patent, it is further stated that prior art attempts to apply plastic film laminates to cardboard face liners have met with the most success by applying the laminate after the corrugated paperboard has been fully formed, such as in the Lang U.S. Pat. No. 5,147,480. Unsuccessful attempts have been made to make outer face liners out of plastic film laminates and to apply these laminated outer face liners directly to the fluted medium. In the Finestone '580 patent, it is stated that these attempts have been unsuccessful, as noted in Lang (col. 16, lines 18–25), because when the plastic film outer face liner is glued to the fluted medium, it is immediately subjected to heat and pressure in order to cure the bond between the outer face liner and the fluted medium. The heat and pressure degrade the plastic film laminate's appearance and other properties. In particular, the fresh, wet adhesive between the plastic film laminate and the fluted medium tends to cause slippage as the corrugated web enters the curing step. Slippage causes unwanted misalignment and unevenness in the surface texture of the finished product. Additionally, the heat that is applied in the curing step tends to cause the plastic film layer of the laminate to shrink.

The Finestone '580 patent states that these problems of slippage and shrinkage of the plastic film, which have not been overcome in the prior art, are addressed and resolved by the invention described in the Finestone '580 patent. Additionally, the Finestone '580 patent states that the invention described therein addresses the need for a low-cost cardboard material that is used to form containers and other structural members that are inexpensive, light-weight, and capable of withstanding heavy loading and impact forces as well as direct contact with water and other fluids.

The Finestone '580 patent describes a container having walls made of a paper/plastic laminate to impart strength and rigidity to the container and to render it capable of resisting damage due to exposure to water and other fluids. The paper side of this laminate is bonded to the paper surface of a fluted layer in this container.

The Olvey U.S. Pat. No. 5,772,819 also describes a container having walls made of a paper/plastic laminate. At column 7, lines 22–25 of this Olvey patent, it is stated that the paper side of this laminate is bonded to the flute tips of a fluted layer.

SUMMARY

A lamination structure comprises a first layer bonded to a second layer. At least one of the first layer and the second layer comprise a thermoplastic film. The first layer is bonded to the second layer by a destruct bond with a starch adhesive. The first layer may be a flat layer or a fluted layer and the second layer may be a flat or fluted layer. At least one surface of the first layer and/or the second layer, which is bonded to the other layer, is the surface of a thermoplastic film. The thermoplastic film is treated or coated in a manner sufficient to permit the surface or surfaces to form the above-mentioned destruct bond, using a starch adhesive.

A paper and plastic structure comprises an inner face liner, an outer face liner and a cardboard core. At least one of the inner face liner, the outer face liner and the cardboard core comprise a thermoplastic film. The inner face liner and the outer face liner are bonded to the cardboard core by destruct bonds with a starch adhesive. At least one surface of the inner face liner, the outer face liner or the cardboard core, which is bonded to the starch adhesive, is the surface of a thermoplastic film. The surface of the thermoplastic film is treated or coated in a manner sufficient to render this surface of the thermoplastic film capable of bonding with the starch adhesive in a destruct manner.

As indicated in the Finestone et al. U.S. Pat. No. 6,083,580, particularly with reference to FIG. 5 therein, the cardboard core may be a planar stiff paper core. This cardboard core may also be a planar stiff plastic core or a planar stiff paper/plastic composite core. Preferably, however, the cardboard core has a fluted or corrugated structure.

DETAILED DESCRIPTION

Figure 1:
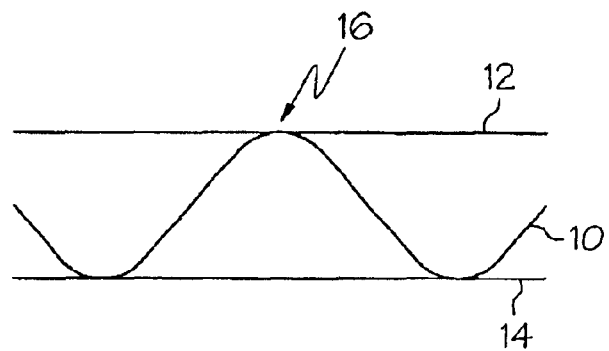
FIG. 1 is an end view of a lamination structure.

FIG. 1 shows a lamination structure with a fluted layer 10 between a first flat layer 12 and a second flat layer 14.

Figure 2:
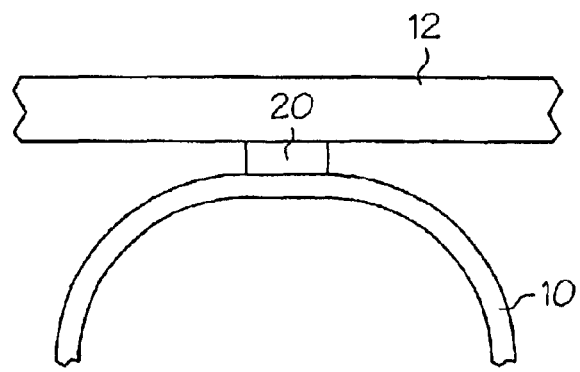
FIG. 2 is an enlarged section of FIG. 1 showing an adhesive bond between a fluted layer and a flat layer.

FIG. 2 provides an enlarged view of region 16 of FIG. 1. FIG. 2 shows the starch adhesive 20, which bonds flat layer 12 to a ridge of fluted layer 10.

At least one of the fluted layer 10, the first flat layer 12 and the second flat layer 14 includes a thermoplastic film. The thermoplastic film may be a mono-layer or a multi-layer film. The thermoplastic film may also be laminated to paper or another thermoplastic film.

The thermoplastic film may be clear transparent, metallized or opaque as produced through technologies that are well known in the art.

Examples of thermoplastic materials for forming the thermoplastic film include thermoplastic polymers which have properties suitable for extrusion or coextrusion. The extruded or coextruded film may be mono-axially orientated or biaxially oriented in the machine and transverse directions under elevated temperature so as to form a mono-layer or multi-layer film. Thermoplastic materials include any polyolefin, such as polypropylene, polyethylene, polybutene; polystyrene; polyvinyl chloride; copolymers and blends thereof. Other thermoplastic film materials include polyethylene terephthalate and nylon. The thermoplastic polymer may be a polypropylene homopolymer. However, other polymers, especially polyolefin homopolymers or copolymers, may be used. These polymers include homopolymers and copolymers made from one or more 2- to 8-carbon olefinic monomers, such as ethylene or 1-butene.

At least one surface of the thermoplastic film is coated or treated to impart the ability of thermoplastic film to form a destruct bond with a starch adhesive. The thermoplastic may be coated with a polymeric material having polar groups. Examples of such polymeric materials are used in various adhesive, primer and binder compositions.

Each polar group, X, may be covalently bonded to a polymeric backbone by a covalent bond in a pendent manner and may be a substituted hydrocarbyl group having 10 or less carbon atoms. Each polar group, X, may also be a constituent of the polymeric backbone attached to other constituents of the polymeric backbone by two covalent bonds and may be a substituted hydrocarbylene group having 10 or less carbon atoms. In particular, the hydrocarbyl or hydrocarbylene groups may be substituted with one or more heteroatoms, such as O, N, and halogen (e.g., Cl). These heteroatoms may be covalently bonded to carbon atoms by single, double or triple covalent bonds, depending, of course, on the ability of the heteroatoms to bond with carbon in such a manner. A substituted hydrocarbyl group may be a methyl group (—CH3) with one, two or three of the hydrogen atoms thereof being substituted with one or more heteroatoms. These heteroatoms may be, in turn, substituted with other atoms, especially hydrogen atoms.

Examples of the polar group X include hydroxymethyl (—CH2OH), carboxyl (—COOH), aminomethyl (—CH2NH2), amide (—CONH2), ethyleneimine (—CH2CH2NH—), nitrile (—CN), and halomethyl (e.g., —CH2Cl).

Examples of coating materials include acrylic, polyvinylidene chloride (PVdC), polyvinyl alcohol (PVOH) and ethylene vinyl alcohol (EVOH) materials.

The acrylic polymers in acrylic coating compositions may comprise one or more acrylic monomers, such as acrylic acid, methacrylic acid, acrylate esters and methacrylate esters. The acrylates may contain lower alkyl groups such as those having from about 1 to about 16 carbon atoms. Specific examples include methyl, ethyl, butyl, lauryl and stearyl. Such acrylic monomers may, optionally, be copolymerized with one or more non-acrylic monomers, such as ethylene and styrene.

Particular examples of acrylic coating compositions are described in U.S. Pat. Nos. 3,753,769; 4,058,645; 4,659,503; 4,749,616; and 5,188,867.

A composition of an acrylic interpolymer is defined in U.S. Pat. No. 3,753,769. This material consists essentially of an interpolymer of from about 2 to about 15 parts, and preferably from about 2.5 to about 6 parts by weight of acrylic acid, methacrylic acid or any mixture thereof and from about 85 to about 98 parts and preferably from about 94 to about 97.5 parts by weight of neutral monomer esters, said neutral monomer esters preferably comprising (1) methyl acrylate or ethyl acrylate and (2) methyl methacrylate. The interpolymer compositions are further characterized by preferably comprising from about 30% to about 55% by weight of methyl methacrylate when said alkyl acrylate is methyl acrylate, and from about 52.5% to about 69% by weight of methyl methacrylate when said alkyl acrylate is ethyl acrylate. The monomer components of the terpolymer are employed in a ratio such that the alkyl methacrylate monomer is present in an amount of at least 10% by weight of the total terpolymer composition and preferably from about 20 to about 80% by weight, and the alkyl acrylate monomer component is present in amounts of at least 10% by weight of the total composition, and preferably from about 80 to about 20% by weight.

U.S. Pat. No. 5,419,960 describes coating compositions comprising copolymers of ethylene and acrylic acid (EAA). The EAA copolymer may be a copolymer of, for example, about 65 to 95 wt. %, preferably about 75 to 85 wt. % of ethylene, and, for example, about 5 to 35 wt. %, preferably about 15 to 25 wt. % of acrylic acid (AA) or methacrylic acid (MA). The copolymer may have a number average molecular weight (Mn) of, for example, about 2,000 to 50,000, preferably about 4,000 to 10,000. Free carboxylate groups (—COO—) on the EAA copolymer may be partially neutralized with ions of at least one metal from Group Ia, IIa or IIb of the Periodic Table, preferably, sodium, potassium, lithium, calcium or zinc ions, and, most preferably, sodium ions. The quantity of such metallic ions may be in the range sufficient to neutralize, for example, about 2 to 80%, preferably about 10 to 50% of the total carboxylate groups in the copolymer.

Acrylic polymers, including EAA copolymers, may be applied as a coating in the form of a liquid solution, dispersion or emulsion. These acrylic polymers may be dissolved, dispersed or emulsified in water, although less preferred organic solvents, such as ketones, alcohols and esters may be used. The addition of ammonia to the aqueous medium promotes better solubility or dispersion of the acrylic polymer.

Polyvinylidene chloride (PVdC) coating compositions are described in U.S. Pat. Nos. 4,214,039; 4,438,176; 4,944,990; 4,965,130; and 4,997,859. Commercially available vinylidene chloride latexes having a vinylidene chloride content of at least 50% and preferably from about 75% to about 92% may be employed. The other ethylenically unsaturated comonomers may include alpha, beta ethylenically unsaturated acids such as acrylic and methacrylic acids; alkyl esters containing 1–18 carbon atoms of said acids such as methyl methacrylate, ethyl acrylate, butyl acrylate, etc.; alpha, beta ethylenically unsaturated nitriles such as acrylonitrile, methacrylonitrile; monovinyl aromatic compounds such as styrene; and vinyl chloride.

The PVdC particles may have a multi-layer structure, as described in U.S. Pat. Nos. 4,965,130 and 4,997,859. In particular, such multi-layered particles may include:

(a) an acrylic seed layer;

(b) an intermediate layer of a vinylidene chloride monomer, an acrylic ester monomer, and an acrylic acid monomer, forming a terpolymer having a high vinylidene chloride concentration; and (c) an outer skin layer of a vinylidene chloride monomer, acrylic ester monomer, and an acrylic acid monomer, forming a terpolymer having a low vinylidene chloride concentration.

Liquid acrylic or PVdC coating materials may also include other additives, including anti-blocking materials, such as microcrystalline wax; hot slip agents, such as colloidal silica; rosin derivatives, such as those described in U.S. Pat. No. 4,058,645; crosslinking agents, such as melamine formaldehyde resins; and anti-static agents, such as poly(oxyethylene) sorbitan monooleate.

Polyvinyl alcohol (PVOH) coating compositions are described in U.S. Pat. Nos. 5,496,649; 5,508,113; 5,547,764; and 6,444,750. The PVOH may have an hydrolysis level of at least 80% and is soluble in water. The PVOH coating solution includes at least one crosslinking agent, such as glyoxal, urea, a melamine-formaldehyde resin, a urea-formaldehyde resin, and borax.

The polymeric coating binder may, optionally, include a particulate additive. The particulate additive, often referred to as filler, may comprise finely divided inorganic solid materials such as silica, including fumed silica, talc, diatomaceous earth, calcium carbonate, calcium silicate, bentonite and clay. The amount of filler may comprise a substantial percentage of the weight of the coating, for example, about 20% to about 80%, based on the entire weight of the coating. Specific examples of fillers include kaolin, silica (also known for antiblocking properties), aluminum silicates, clay and talc. Pulp may also be employed.

The thermoplastic film structure of the present invention can have an overall thickness within a wide range, but it is preferably from about 0.5 up to about 1.75 mils in thickness. When the film includes a core layer and at least one coextruded skin layer, each coextruded skin layer can be present in a thickness of from about 0.02 to about 0.12 mils.

When a polymer coating is applied to the film surface, the amount of polymer may be varied. Coating weights of from about 0.3 to about 1.2 grams per 1,000 square inches may be employed. Optionally, the film surface may be treated by plasma, corona or flame treatment, before the coating is applied. A primer coating may also, optionally be applied to the film surface, before the final coating is applied. The primer coating may be poly(ethylene imine) or an epoxy, such as the epoxy described in U.S. Pat. No. 4,214,039.

The coating composition may be applied to the surface of the polymer film in any suitable manner such as by gravure coating, roll coating, dipping, spraying, etc. Excess aqueous solution can be removed by squeeze rolls, doctor knives, etc. The coating composition may be applied in such an amount that there will be deposited, following drying, a smooth, evenly distributed layer of from about 0.02 to about 0.10 mil thickness.

Examples of treatments, especially for uncoated thermoplastic films, include those, which impart a high degree of energy to the film surface. In particular, the treatment may result in surface tension level of at least 39 dynes/cm, for example, at least 42 dynes/cm, for example, at least 46 dynes/cm, for example, 48–52 dynes/cm. Such treatments may include corona, plasma or flame treatment. However, it is difficult to achieve the desired level of surface tension, unless at least a portion of the treatment is conducted by flame treatment. Furthermore, certain thermoplastic materials, such as polypropylene, tend to become damaged by such high energy treatment. Accordingly, when a thermoplastic film comprises polypropylene, e.g., as a core layer, it is preferred to apply a skin layer capable of withstanding high energy flame treatment, prior to conducting such treatment.

ASTM method D-2578 may be used for testing the energy of a film surface, particularly in terms of dynes/cm.

It will be understood that a coated or treated surface of the thermoplastic film is contacted with a starch adhesive to form a destruct bond. With reference to FIG. 2, it will be further understood that such a destruct bond is one which remains intact when fluted layer 10 and flat layer 12 are pulled apart to the extent that tearing of either the fluted layer 10 or the flat layer 12 occurs. In other words, failure occurs in the layer(s) before failure occurs in the adhesive or in the bond between the adhesive and a layer surface.

ASTM method F-904 may be used to test the bond strength of a starch adhesive used to bond layers to one another.

Figure 3:
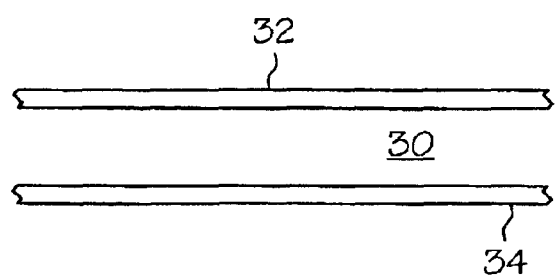
FIG. 3 is an end view of a multi-layer thermoplastic film.

FIG. 3 shows an example of a multi-layer thermoplastic film. The film includes a core layer 30, a first skin layer 32 and a second skin layer 34. Although a three-layer film is shown in Example 3, it will be understood that multi-layer films having, for example, from 2 to 12 thermoplastic layers, may be used. Such multi-layer films may have one or two skin layers, one or more core layers, and one or more intermediate layers between a base or core layer and each skin layer. Two or more multi-layer films, especially coextruded multi-layer films, may also be laminated to one another with a suitable adhesive.

The polymers of the core layer 30, skin layer 32 and skin layer 34, as well as any tie layers, may be thermoplastic materials described herein for forming thermoplastic films.

A particular thermoplastic polymer of the core layer 30 may be a polypropylene homopolymer. However, other polymers, especially polyolefin homopolymers or copolymers, may be used. These polymers include homopolymers and copolymers made from one or more 2- to 8-carbon olefinic monomers, such as ethylene or 1-butene. It will be understood that the expression, copolymer, as used herein connotes a polymer, including a terpolymer, of two or more monomers.

The first skin layer 32 or the second skin layer 34 or both the first skin layer 32 and the second skin layer 34 may be a heat sealable layer, especially heat sealable polyolefinic copolymers and terpolymers and blends thereof. The copolymers include block copolymers, for example of ethylene and propylene, and random copolymers, for example of ethylene and propylene. Terpolymers are exemplified by ethylene-propylene-butene-1 terpolymers. Also, heat sealable blends can be utilized in providing this layer. Thus, along with the copolymer or terpolymer there can be polypropylene homopolymer or other material which does not impair the heat sealability of this layer.

The first skin layer 32 or the second skin layer 34 or both the first skin layer 32 and the second skin layer 34 may comprise a polypropylene homopolymer, such as highly crystalline polypropylene (HCPP). HCPP polypropylene polymers include those having a decalin solubles content of less than about 5% by weight, meso pentads equal to or greater than about 85% (13C NMR spectroscopy), and a melt flow of about 2.5 to about 3 (as measured according to the standard ASTM D1238 test for polypropylene). Suitable commercially available HCPP polymers include, but are not limited to, Amoco 9218 HCPP resin from BP-Amoco.

Particular polymers for forming skin layers 32 and 34 include metallocene catalyzed polyethylene. Such metallocene catalyzed polyethylene polymers are described in published U.S. Patent 2002/0122952 and may have a melt index ranging from about 0.1 to about 10 g/10 minutes, a density ranging from about 0.88 to about 0.965 g/cm3, polydispersity ranging from about 2 to about 10, and a melting point ranging from about 90° C. to about 140° C.

Melt index (MI) may be measured according to ASTM D1238.

Polydispersity is defined as the ratio of weight average molecular weight (MW) to the number average molecular weight (Mn), i.e., polydispersity=$M_w/M_n$.

Weight average molecular weight (MW) and number average molecular weight (Mn) may be determined by Gel permeation chromatography.

Melting point (MP) may be measured with a differential scanning calorimeter (DSC).

When thermoplastic film having a polypropylene core 30 is to be flame treated to provide a high energy surface, it is preferred to apply a high density polyethylene (HDPE) skin 32 or 34 to the core 30. This HDPE skin 32 or 34 is capable of withstanding such flame treatment.

HDPE has a density of greater than about 0.941 g/cm3, typically from about 0.941 to about 0.965 g/cm3. High density polyethylene suitable for use as skin layer 32 or 34 is described in Bakker, Ed. "The Wiley Encyclopedia of Packaging Technology", pp. 514 to 523 (1986).

Multi-layer films with a polypropylene core 30, a first polypropylene skin 32 and a second flame treated HDPE skin 34 are described in U.S. Pat. Nos. 4,855,187; 6,472,077; and 6,074,762.

Sometimes it is useful to enhance or provide the film with certain properties by use of appropriate film additives. Such additives are used in effective amounts, which vary depending upon the property required, and may be selected from the group consisting of antistatic, antiblock, slip, or antioxidant additives. These additives may be added to one or more layers of the film.

Either of the skin layers 32 and 34 of the film can optionally contain a minor amount of antiblock particles, such as clays, talc, glass, and others. One antiblock material can be used alone, or different sizes and shapes can be blended to optimize machinability. The major proportion of the particles, for example, more than half, may be of such a size that a significant portion of their surface area, will extend beyond the exposed surface of such skin layer. Suitable antiblocks include, but are not limited to, fully cross-linked non-meltable polymethyl methacrylate (PMMA) particles, such as EPOSTAR MA-1002 from Nippon Shokubai, or silica (SiO2) particles, such as SYLOBLOC 44 from W. R. Grace, or fully cross-linked or non-meltable polysiloxane micro-spheres, such as TOSPEARL T120A, from Toshiba Silicone Company, Ltd. Partially cross-linked polysiloxane particles, which release non-cross-linked liquid silicone under stress, as described in U.S. Pat. No. 5,840,419, can also be used. The solid antiblock may be incorporated into the layer in an amount ranging from about 0.1 to about 0.5% by weight, preferably from about 0.15 to about 0.30% by weight, based on the entire weight of the layer.

Useful antistatic additives which can be used in amounts ranging from about 0.05 to about 3 weight %, based upon the weight of the layer, include alkali metal sulfonates, polyether-modified polydiorganosiloxanes, polyalkylphenylsiloxanes and tertiary amines. The antistatic agent may be glycerol monostearate (GMS) or a blend of GMS and tertiary amine.

Slip additives include higher aliphatic acid amides, higher aliphatic acid esters, waxes and metal soaps, which can be used in amounts ranging from about 0.1 to about 2 weight percent based on the total weight of the layer. A specific example of a fatty amide slip additive is erucamide.

Optionally, one or more layers are compounded with a wax for lubricity. Amounts of wax range from about 1 to about 15 weight % based on the total weight of the layer. Waxes and slip additives tend to migrate towards the surface of the film. Therefore, it may be necessary to include such additives in a core or tie layer, and not directly in either of the skin layers, to delay their migration.

Antioxidants, such as phenolic antioxidants, may be used in amounts ranging from about 0.1 weight % to about 2 weight percent, based on the total weight of the layer. An example of an antioxidant is commercially available under the trademark IRGANOX 1010 from Ciba-Geigy.

The film may be formed by coextruding the thermoplastic polymer-containing core layer 30 together with the at least one skin layer 32 and 34 and optional additional layers through a flat sheet extruder die at a temperature ranging from between about 200° C. to about 275° C., casting the film onto a cooling drum and quenching the film. The sheet may then be stretched about 4 to about 6 times in the machine direction (MD) between rolls, and then stretched about 6 to about 10 times in the transverse direction (TD) in a tenter. Alternatively, the MD and TD stretches may occur more or less simultaneously by means of suitable machinery, such as described in U.S. Pat. No. 4,853,602. As another option, the film may be mono-axially stretched, e.g., about 4 to about 6 times. The film may then be wound onto a reel. Optionally, one of the external surfaces is coated or flame- or corona-treated before winding. In addition, the production process may also include coating an adhesive and/or cold seal layer on one or both surfaces of the multi-layer polymeric film.

The core layer 30 may represent about 70 to about 90 percent of the thickness of the total multi-layer polymeric film. The skin layers 32 and 34 are usually coextensively applied to each major surface of the core layer, typically by coextrusion, as noted above. However, skin layers arrived at by coextrusion may not, ultimately, be the outermost layers.

The surface, opposite to the starch adhesive bond 20, of the thermoplastic film may, optionally, be metalized.

Metal layers are known in the art, and can be deposited using any known method, for instance, vacuum deposition, electroplating, sputtering, etc. Preferably, the metal layer is one of vacuum deposited aluminum, copper, silver, chromium, gold, and mixtures thereof, with vacuum deposited aluminum being most preferred. A protective acrylic or other polymeric coating may be deposited over the metal layer under vacuum, preferably in the metallization machine, as taught, for example, by U.S. Pat. No. 4,842,893.

A polymeric film may be laminated to the metal layer of the multi-layer film to protect the metal from scratching and scuffing during use. Such polymeric film can improve the gauge, stiffness and puncture resistance of the overall film, and can further enhance the barrier properties of the film. The polymeric film can be oriented, unoriented, transparent or opaque. Preferably, the polymeric film has at least a core layer of polypropylene or polyethylene, most preferably oriented polypropylene (OPP). Such an additional polymeric film can be laminated to the metal layer using any suitable adhesive. A particularly preferred adhesive is a hot melt low density polyethylene, applied in an amount of about 10 pounds per ream.

The multi-layer thermoplastic films may have a total thickness of, for example, about 10 to about 50 μm. Each skin layer may have a thickness of, for example, about 0.5 to about 4 μm.

Figure 4:
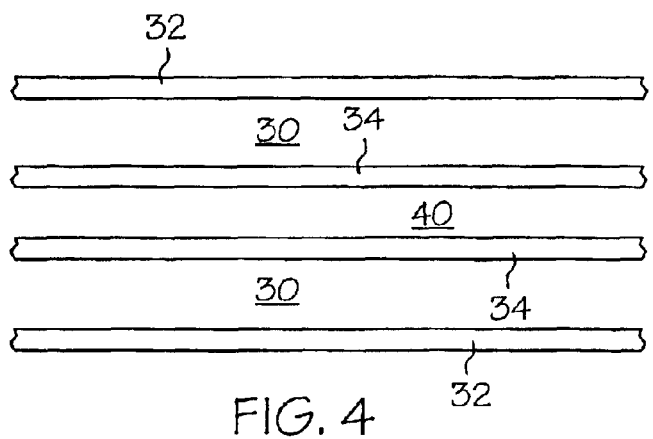
FIG. 4 is an end view of two multi-layer thermoplastic films, which are laminated to one another with an adhesive.

FIG. 4 shows a multi-layered thermoplastic film prepared by laminating two films of FIG. 3 with adhesive 40. The exposed (outer) surfaces of skins 32 are flame treated to provide a high energy surface with a surface tension of at least 39 dynes/cm, for example, at least 42 dynes/cm. The interior surfaces, bonded to adhesive 40, of skin layer 34 may be treated to a lower energy, e.g., of 38 dynes/cm or less, by corona treatment. The high energy surfaces of skin layers 32 are both capable of forming a destruct bond with a starch adhesive. However, the lower energy surfaces of skin layer 34 would not have sufficient energy to form a destruct bond with a starch adhesive. ASTM method D-2578 may be used for testing the surface tension of the film.

Adhesive 40 may be a hot melt adhesive, such as low density polyethylene; an ethylene-methacrylate copolymer; a water-based adhesive, such as polyvinylidene chloride latex; and the like. When the surfaces of both skin layers 32 and 34 are treated to have sufficient energy, adhesive 40 may be a starch adhesive.

Figure 5:
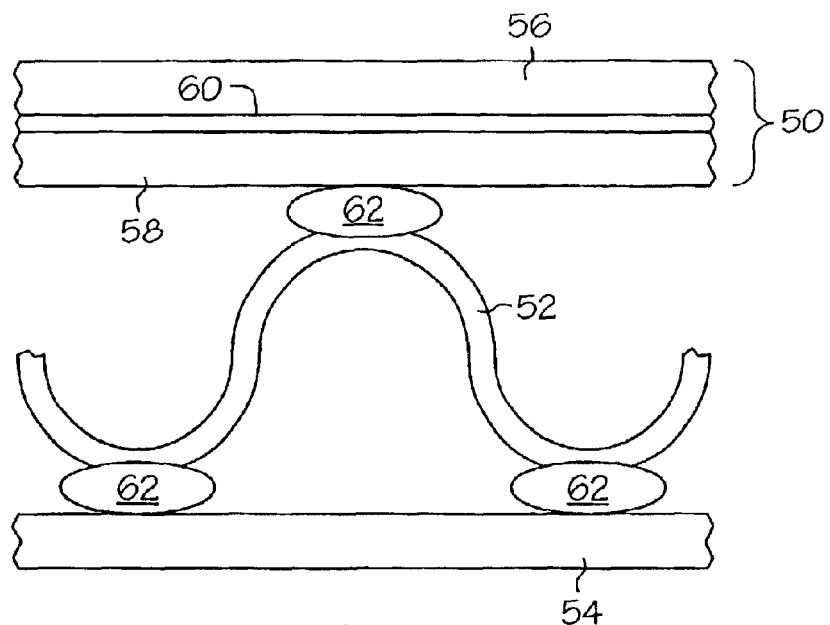
FIG. 5 is an end view of a lamination structure.

FIG. 5 shows a lamination structure, wherein a flat composite paper/plastic layer 50 is laminated to a fluted paper layer 52, which is, in turn, laminated to a flat paper layer 54.

The composite paper/plastic layer 50 has an outer paper layer 56 laminated to an inner plastic layer 58 with an adhesive layer 60. The composite paper/plastic layer 50 is laminated to the fluted paper layer 52 with starch adhesive 62. The fluted paper layer 52 is also laminated to flat paper layer 54 with starch adhesive 62.

Plastic layer 58 may be a mono-layer film or a multi-layer film, for example, having the structure shown in FIG. 3 or FIG. 4, provided that the surface of the plastic film, which is bonded to the fluted paper layer 52, is sufficiently treated or coated to form a destruct bond via the starch adhesive 62.

Figure 6:
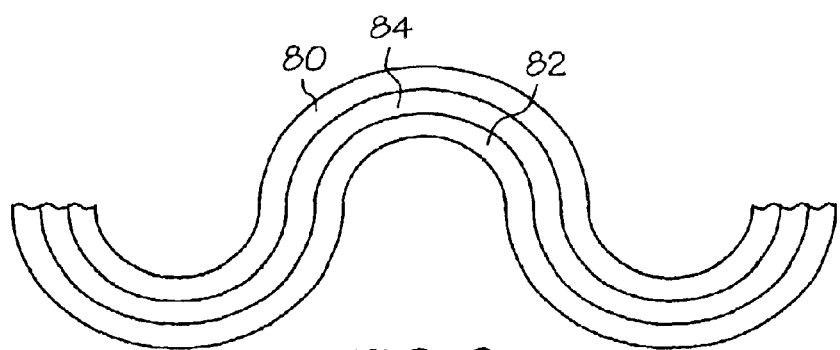
FIG. 6 is an end view of a fluted layer.

FIG. 6 shows a composite fluted layer with an upper layer 80 bonded to a lower layer 82 with an adhesive layer 84. The upper layer 80 or the lower layer 82 or both the upper layer 80 and the lower layer 82 is a plastic layer having a mono-layer or a multi-layer structure. Either the upper layer 80 or the lower layer 82, but not both the upper layer 80 and the lower layer 82, may be a paper layer.

FIG. 6 shows a first fluted layer 80 bonded to a reciprocal fluted layer 82 with an adhesive layer 84. When the surfaces of the first fluted layer 80 and the second reciprocal fluted layer 82 are sufficiently treated or coated in the manner described herein, the adhesive in the adhesive layer 84 may be a starch adhesive. Plastic outer surfaces of layers 80 and 82, opposite from surfaces bonded to adhesive layer 84, may also be treated or coated in the manner described herein to permit sufficient bonding to a starch adhesive.

The fluted structure shown in FIG. 6 may be prepared by first forming a flat structure with flat layers corresponding to layers 80, 82, and 84. This flat structure may then be passed through two corrugator rolls in a conventional process to form a fluted or corrugated structure. Such a conventional process is described and illustrated in the Lang U.S. Pat. No. 5,147,480.

FIG. 4 provides an example of a flat structure which may be converted into a fluted structure, with corrugator rolls by the conventional process.

EXAMPLE 1

A film designated 100 LBW (available from ExxonMobil Chemical Company, Macedon, N.Y.) was used to test the overall compatibility of the water-based starch glue to plastic substrates. 100 LBW is a biaxially oriented three-layer film with a thickness of 1 mil and having a polypropylene core layer, a polypropylene skin layer and an HDPE skin layer. The HDPE skin layer is flame treated to provide a high-energy (HE) surface with a surface tension of 48–52 dynes. LBW films are described in a brochure entitled "Flexible Packaging Films-Product Characteristics—5th Edition".

LBW is a two-side treated, slip modified, non heat-sealable OPP film designed for use as the outside web of a lamination. The high-energy surface is intended as the print and laminating side. Its key performance characteristics are high-energy surface for excellent ink adhesion and bond strengths in adhesive, PVdC adhesive, and extrusion laminations. Its non-migratory slip system provides for consistent Coefficient of Friction. Its high-energy surface is exceptionally receptive to water-borne and solvent-base inks and adhesives.

Starch glue was applied to the high-energy (HE) surface of 100 LBW with a #5 Mayer rod, yielding a coating weight of 4.27 gms/msi. The starch glue is available from Grain Processors, Iowa. A layer of double back kraft paper was immediately applied to the wet adhesive and light hand pressure was applied to the entire surface.

The lamination was placed on a glass panel in a 165° F. (74° C.) oven with the film surface facing up. A pre-heated, 6.5"×6.5" steel template (9# or 0.25 PSI) was applied to the center of the lamination. The oven door was closed and the glue was allowed to cure for 30 seconds. The sample was then removed and cooled to room temperature.

A destruct bond was formed at the HE LBW surface.

Comparative Example 1

Example 1 was repeated, except that room temperature "air drying" was used with standard pressure. A destruct bond was not formed. Heat is required to cure the adhesive.

Comparative Example 2

Example 1 was repeated, except that oven drying took place without the application of pressure. A destruct bond was not formed. Pressure is required to cure adhesive.

Comparative Example 3

Example 1 was repeated, except that the starch glue was applied to the opposite side of the 100 LBW film. This opposite side was corona treated to have a surface tension of about 36 to 38 dynes/cm.

Variable bond strengths were achieved, but typically in the unacceptable range of 10–100 gms/in.

EXAMPLE 2

Example 1 was repeated, except that 100 AB-X film (available from ExxonMobil Chemical Company) was used in place of 100 LBW. 100 AB-X has a thickness of 1 mil. An acrylic coating is applied to a surface of 100 AB-X via a liquid (water-based) acrylic coating material.

AB-X films are two-side acrylic coated on specially designed adhesion promoting layers. They are sealable OPP films designed for general use in many applications, including overwrap, horizontal, and vertical packaging. They are suitable as an unsupported web or in a lamination. They can be surface printed, or used unprinted. The acrylic coatings may be derived from any of the terpolymeric compositions disclosed in U.S. Pat. Nos. 3,753,769 and 4,865,908. These coating compositions contain, as a film forming component, a resin including an interpolymer of (a) from 2 to 15 of from 2.5 to 6 parts by weight of an alpha-beta monoethynically unsaturated carboxylic acid including one or more of acrylic acid, methacrylic acid, or mixtures thereof, and (b) from 85 to 98 or from 94 to 97.5 parts by weight of neutral monomer esters, the neutral monomers including (1) methyl acrylate or ethyl acrylate and (2) methyl methacrylate. These interpolymer compositions are further characterized by including from 30 percent to 55 percent by weight of methylmethacrylate when the alkyl acrylate is methyl methacrylate and when the alkyl acrylate is ethyl acrylate. Such coating compositions may be applied to the films herein in a variety of ways. An intermediate primer coating may also be subsequently applied with a continuous coating of a primer material. Such primer materials include, for example, epoxy, urethane or poly(ethylene imine) (PEI) materials. U.S. Pat. Nos. 3,753,769; 4,058,645; and 4,439,493 disclose the use and application of such primers. The primer provides an overall adhesively active surface for thorough and secure bonding with the subsequently applied coating composition and may be applied to the film by conventional solution coating means, for example, by mating roller application.

The starch glue was applied to the acrylic coated surface of 100 AB-X.

A destruct bond was formed at the acrylic coated surface.

EXAMPLE 3

A composite paper/plastic layer was laminated to a fluted core lamination structure.

The composite paper/plastic layer was made by the procedure of Example 1, except that the 100 LBW film was replaced with a 50 LBW/50 LBW film (available from ExxonMobil Chemical Company). This 50 LBW/50 LBW film is a lamination structure, wherein two 50 LBW films are laminated to one another with an adhesive. Each 50 LBW film is essentially the same as a 100 LBW film, except that 50 LBW has a thickness of 0.5 mil (i.e., half the thickness of 100 LBW), primarily due to a thinner core layer.

In the 50 LBW/50 LBW film structure, the high energy HDPE surface of each 50 LBW film is exposed on the exterior of the lamination. Referring to FIG. 4, in 50 LBW/50 LBW film, exterior skin layers 32 are high energy, flame treated HDPE layers, core layers 30 are polypropylene layers, and interior skin layer 34 are corona treated polypropylene layers. The interior skin layer 34 are bonded together with adhesive 40.

Starch glue was applied to a high energy (HE) surface of 50 LBW/50 LBW film with a #5 Mayer rod, yielding a coating weight of 4.27 gms/msi. The starch glue particulates are from Grain Processors, Iowa. A layer of double back kraft paper was immediately applied to the wet adhesive and light hand pressure was applied to the entire surface.

The lamination was placed on a glass panel in a 165° F. (74° C.) oven with the film surface facing up. A pre-heated, 6.5"×6.5" steel template (9# or 0.25 PSI) was applied to the center of the lamination. The oven door was closed and the glue was allowed to cure for 30 seconds. The sample was then removed and cooled to room temperature to provide the paper/plastic composite structure.

A fluted core lamination structure was provided by laminating one side of a fluted kraft paper core stock to a flat kraft paper surface.

The above-mentioned starch glue was drawn down to a surface of a clean glass plate. The fluted core lamination structure (flutes down) was immediately exposed to the adhesive coated glass with light pressure. The fluted core lamination structure with adhesive applied to the peaks of the flutes was removed.

The wet adhesive surface of the fluted core lamination structure was immediately applied to the high density HDPE surface of the composite paper/plastic structure with light hand pressure.

The lamination was placed on a glass panel in a 165° F. (74° C.) oven with the film surface facing up. A pre-heated, 6.5"×6.5" steel template (9# or 0.25 PSI) was applied to the center of the lamination. The oven door was closed and the glue was allowed to cure for 30 seconds. The sample was then removed and cooled to room temperature.

Sample plaques, 6"×6", were cut out. The finished structure is:

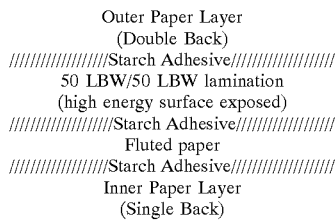

Outer Paper Layer
(Double Back)
//////////////////Starch Adhesive//////////////////
50 LBW/50 LBW lamination
(high energy surface exposed)
//////////////////Starch Adhesive//////////////////
Fluted paper
//////////////////Starch Adhesive//////////////////
Inner Paper Layer
(Single Back)

Testing confirmed the presence of destruct bonds at the location of each starch adhesive bond.

What is claimed is:

1. A paper and plastic board structure comprising an inner face liner, an outer face liner and a cardboard core, wherein said inner face liner and said outer face liner are bonded to said cardboard core by destruct bonds with a starch adhesive, wherein at least one surface of said inner face liner, said outer face liner or said cardboard core, which is bonded to said starch adhesive, is the surface of a thermoplastic film, wherein said surface of said thermoplastic film is treated or coated in a manner sufficient to render said surface of said thermoplastic film capable of bonding with said starch adhesive in a destruct manner.

2. A paper and plastic board structure according to claim 1, wherein said cardboard core is a fluted core.

3. A paper and plastic board structure according to claim 2, wherein said fluted core and said inner face liner comprise kraft paper.

4. A paper and plastic board structure according to claim 2, wherein said surface of said thermoplastic film layer is flame treated.

5. A paper and plastic board structure according to claim 3, wherein said thermoplastic film comprises a biaxially oriented polypropylene core layer and a high density polyethylene skin layer, and wherein the surface of said skin layer is said surface of said thermoplastic film.

6. A paper and plastic board structure according to claim 5, wherein said outer face liner comprises said thermoplastic film.

7. A paper and plastic board structure according to claim 1, wherein said surface of said thermoplastic film is treated to have a surface tension level of at least 39 dynes/cm.

8. A paper and plastic board structure according to claim 3, wherein said surface of said thermoplastic film is treated to have a surface tension level of at least 42 dynes/cm.

9. A paper and plastic board structure according to claim 4, wherein said surface of said thermoplastic film is treated to have a surface tension level of at least 46 dynes/cm.

10. A paper and plastic board structure according to claim 1, wherein said surface of said thermoplastic film is coated with a coating selected from the group consisting of an acrylic coating, a polyvinylidene chloride coating, a polyvinyl alcohol coating and an ethylene vinyl alcohol coating.

11. A paper and plastic board structure according to claim 10, wherein said thermoplastic film comprises a biaxially oriented polypropylene core layer, wherein said cardboard core is a fluted core, and wherein said cardboard core and said inner face liner comprise kraft paper.

12. A paper and plastic board structure according to claim 1 comprising a fluted core, wherein said fluted core comprises said thermoplastic film.

13. A paper and plastic board structure according to claim 1, wherein said paper and plastic board structure is a corrugated board structure, and wherein said corrugated board structure is formed into a container or a furniture structural member.

14. A lamination structure comprising a first layer bonded to a second layer;

wherein said first layer is bonded to said second layer by a destruct bond with a starch adhesive;

wherein said first layer is a flat layer or a fluted layer and said second layer is a flat layer or a fluted layer;

wherein at least one surface of said first layer and said second layer, which is bonded to the other layer, is the surface of a thermoplastic film; and wherein said thermoplastic film is treated or coated in a manner sufficient to permit said surface or surfaces to form said destruct bond.

15. A lamination structure according to claim 14, wherein said first layer is a flat layer and said second layer is a fluted layer.

16. A lamination structure according to claim 15, wherein a surface of said thermoplastic film layer, which is bonded to the other layer, is flame treated.

17. A lamination structure according to claim 14, wherein said thermoplastic film layer, which is bonded to the other layer, comprises a biaxially oriented polypropylene core layer and a high density polyethylene skin layer, wherein said skin layer is flame treated and bonded to the other layer with a starch adhesive.

18. A lamination structure according to claim 14, wherein a surface of said thermoplastic film layer, which is bonded to the other layer, is treated to have a surface tension level of at least 42 dynes/cm.

19. A lamination structure according to claim 16, wherein said flame treated surface has a surface tension level of 48–52 dynes/cm.

20. A lamination structure according to claim 14, wherein a surface of said thermoplastic film layer, which is bonded to the other layer, is coated with a coating selected from the group consisting of an acrylic coating, a polyvinylidene coating, a polyvinyl alcohol coating and an ethylene vinyl alcohol coating.

21. A lamination structure according to claim 20, wherein said first layer is a flat layer and said second layer is a fluted layer.

22. A lamination structure according to claim 20, wherein said thermoplastic film layer, which is bonded to the other layer, comprises a biaxially oriented polypropylene core layer.

23. A lamination structure according to claim 22, wherein said coating is an acrylic coating.

24. A lamination structure according to claim 14, wherein said first layer is a fluted layer and said second layer is a fluted layer.

25. A lamination structure according to claim 24, wherein said first layer is a kraft paper layer and said second layer is a thermoplastic layer, and wherein said lamination structure is formed (a) by affixing a flat paper layer to a flat thermoplastic layer with a starch adhesive to form a flat laminate structure and (b) by passing said flat laminate structure through two corrugator rolls to form a fluted structure.

* * * * *